Nov. 12, 1935.  C. H. COOLIDGE  2,020,877
OPERATOR FOR INTERMITTENT RECIPROCATING ACTION
Filed July 7, 1934  3 Sheets-Sheet 1
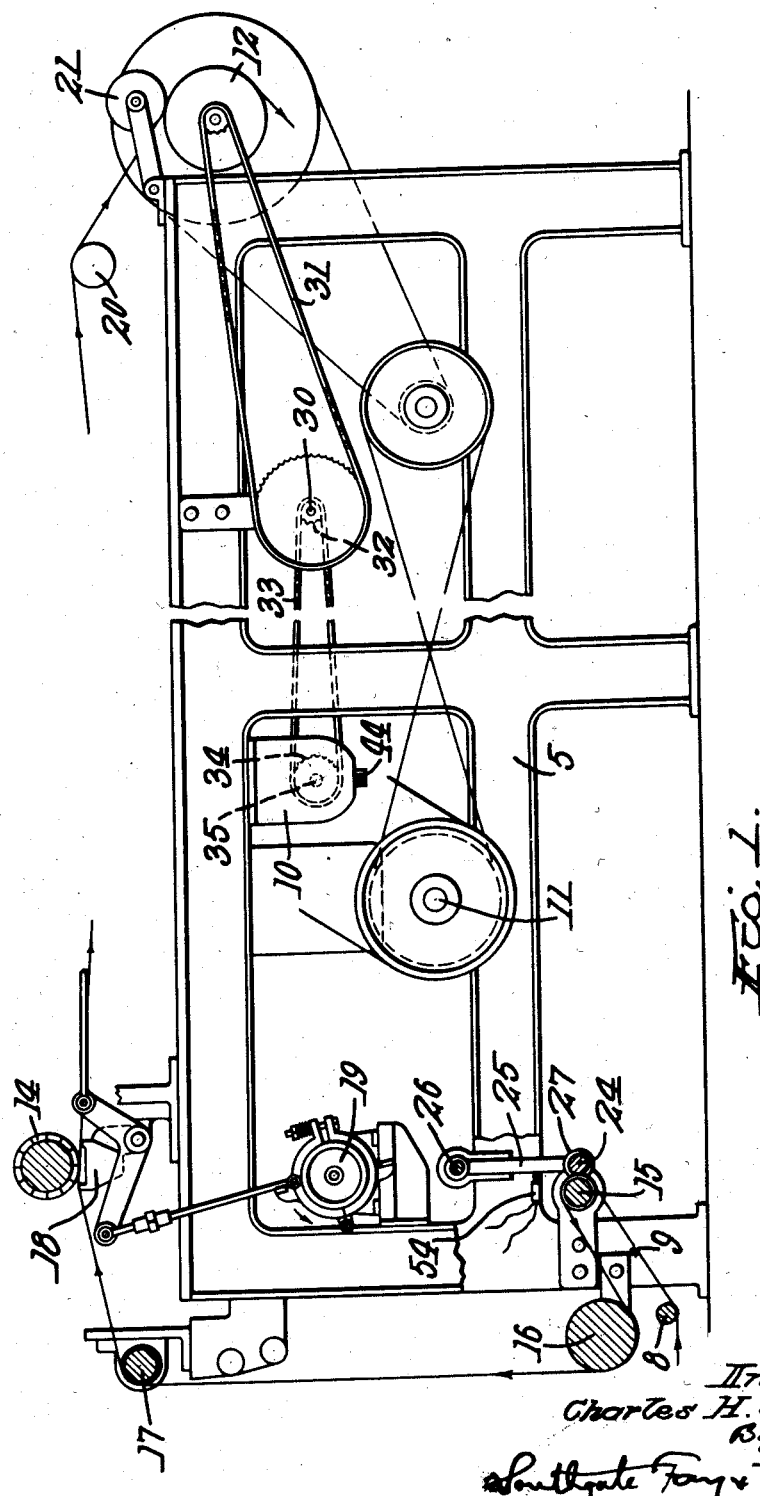

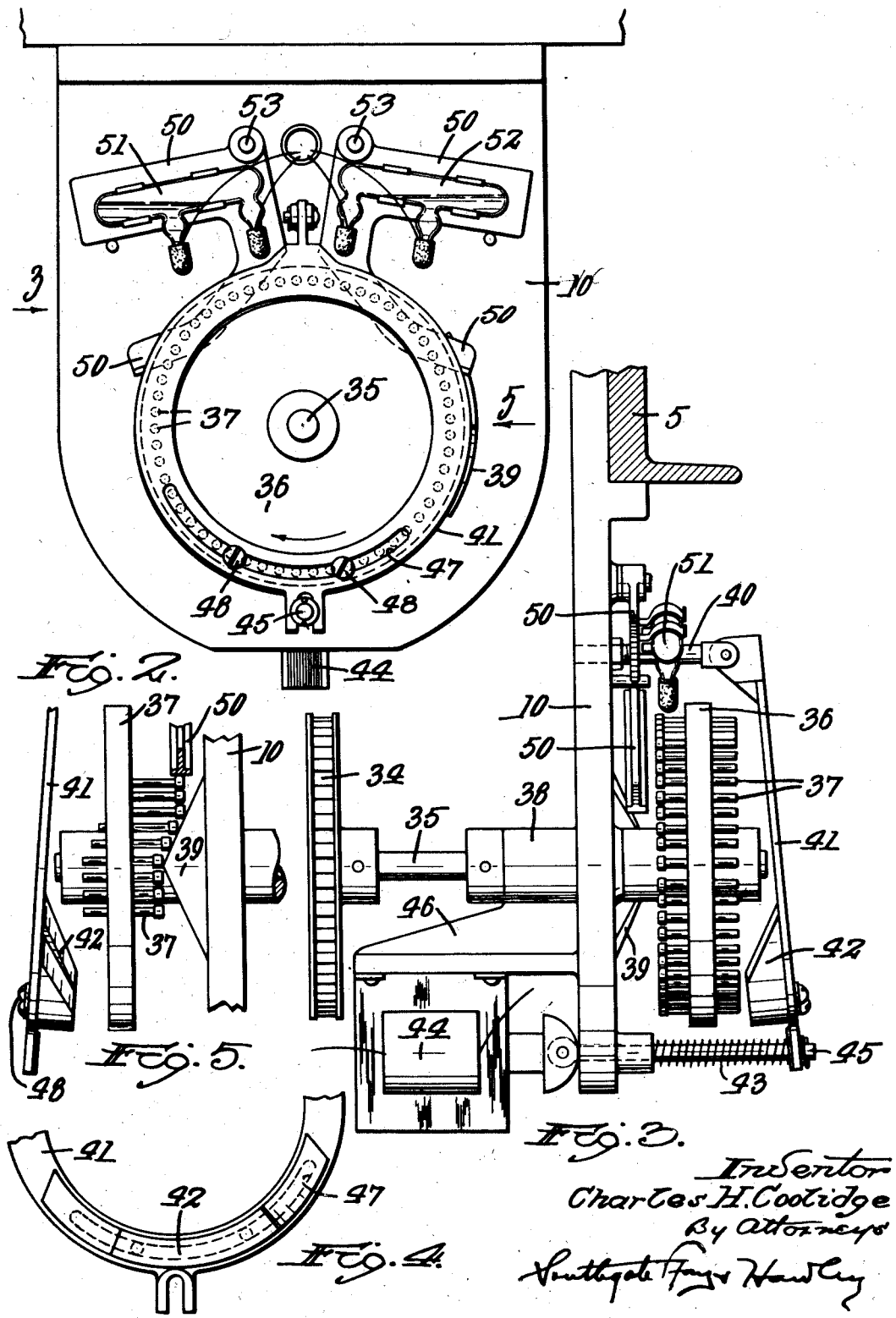

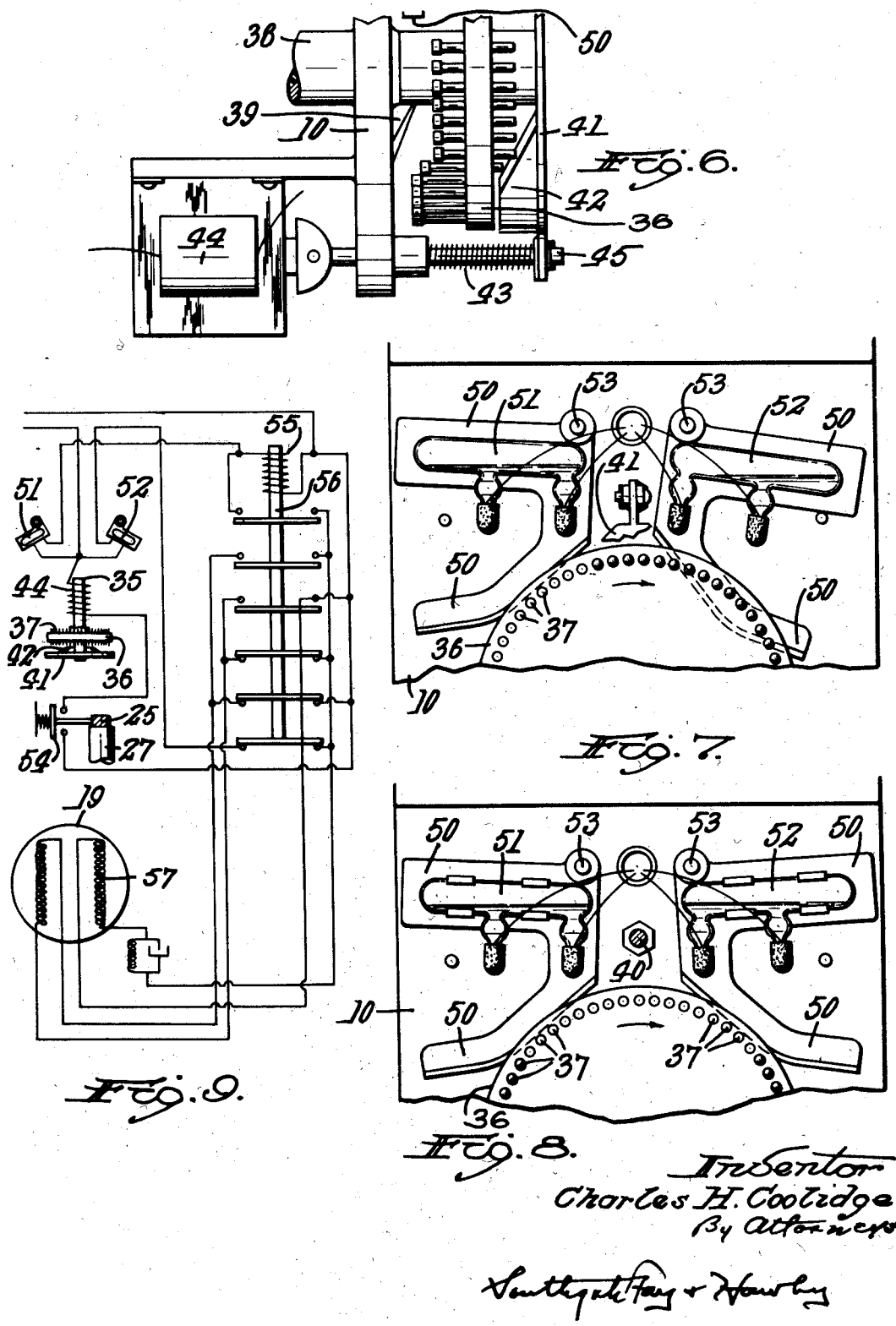

Patented Nov. 12, 1935

2,020,877

UNITED STATES PATENT OFFICE 2,020,877

OPERATOR FOR INTERMITTENT RECIPROCATING ACTION

Charles H. Coolidge, Worcester, Mass., assignor to Curtis & Marble Machine Company, Worcester, Mass., a corporation of Massachusetts Application July 7, 1934, Serial No. 734,167

5 Claims. (Cl. 74—568)

This invention relates to a device for controlling the operation of a mechanism which performs its function in connection with an article that moves through the machine.

The principal object of the invention is to provide automatic means of a particularly sensitive nature for stopping the operation of a part of a machine so as to interrupt the function of the said part and to place it back into operation again automatically.

The invention involves the construction of means for causing the interruption in such form that it will be sensitive to a much higher degree than was the case heretofore and will reduce the time during which the mechanism is prevented from operating and also to provide an arrangement by which a second interruption can be provided for during the first interruption without causing any complications in operation.

The invention is capable of use in many types of machines, for example, Tigers, carding machines, rubber calendering machines, cloth processing machines and any machine where intermittent operation, particularly reciprocation, is required.

The principle of this invention is particularly applicable to cloth shearing machines in which lengths or cuts of cloth are sewed together at their ends to pass through the machine in a continuous manner while one or both surfaces are sheared. Whenever one of these seams comes to the point of shearing it is necessary to prevent the operation of the shearing mechanism for a short period of time. Otherwise the shears would cut into the seam and cause trouble.

Furthermore, if any other interruption occurs, such as a projection on the cloth, the same trouble is encountered. Therefore, it is possible that two such interruptions may occur, one closely following the other. This makes automatic devices for this purpose somewhat difficult.

This machine is designed to provide for that difficulty by enabling the means for stopping the machine to be kept in stopping position, if the second obstruction is encountered, leaving the total unsheared part of the cloth or a length equal to the distance apart of the two projections on the cloth plus the normal space for safety before and after interruption.

In modern practice two difficulties arise owing to the fact that the seam between the two pieces of cloth is sometimes made with the end of the two pieces of cloth butted together so that the additional thickness is merely the thickness of the thread and the maximum speed has been increased by fifty percent. This machine is designed to operate accurately and consistently under these conditions.

Other objects and advantages of the invention will appear hereinafter.

Reference is to be had to the accompanying drawings in which

Fig. 1 is a side elevation, partly in section, of a sufficient portion of a cloth shearing machine to illustrate the application of this invention thereto;

Fig. 2 is a side elevation of a preferred means for controlling the starting and stopping of the function of shearing;

Fig. 3 is an edge elevation of the same as indicated by the arrow 3 in Fig. 2.

Fig. 4 is an inside view of a cam forming a part of the same;

Fig. 5 is an edge view opposite to Fig. 3, as indicated by the arrow 5 in Fig. 2;

Fig. 6 is a view similar to Fig. 3 but with the cam closed instead of open and showing the means for operating the cam;

Figs. 7 and 8 are two views similar to the upper part of Fig. 2 showing the switches, actuated by the mechanism shown in Fig. 3, in two different positions, and Fig. 9 is a wiring diagram.

This invention is designed for controlling intermittent operation. It can be applied to those machines in which, during the feeding of the material through the machine in a constant manner, it is necessary to obtain at intervals a cessation of movement of certain operating parts and a return of said operating parts to operative condition thereafter without stopping the feed of the material through the machine. The interruption may be necessitated in any way but it must be of such a nature that some moving element can be actuated by the material passing through the machine to control the interruption and the return above mentioned. In other words, this part that detects the condition which requires interruption has to be capable of a material motion. This particular invention has nothing to do with this detecting device except that the detecting device controls the starting of the interruption.

This invention relates to the duration of the interruption and the continuation of the interruption in case of a second condition occurring to start the interruption before the return of the operating parts to their operative condition.

This invention is particularly useful for the purpose of interrupting the shearing action in a cloth shearing machine without stopping the travel of the cloth and is described herein in connection therewith. This interruption is performed on cloth shearing machines either by moving the shearing unit away from the fixed line of cloth travel or withdrawing the cloth supporting means away from the cloth shearing unit. In either case the shearing unit is rendered inoperative intermittently. This motion must be limited in its duration to a specific length of cloth definitely located on each side of a seam or other projection in the fabric. Such definite portion of the cloth must not be subject to contact with the shearing unit. The start to such non-operative position of the shearing unit or cloth support must be initiated by some form of detector means which controls a mechanical operator, which is the subject of this invention.

To render inoperative the shearing unit during the passage of the cloth through the machine, in accordance with this invention, a revoluble disc is provided carrying a series of pins parallel with the axis of the disc and of uniform length. The length of the pins is greater than the thickness of the disc. These pins are arranged in a circle concentric with the center of rotation of the disc and positioned in end relation to the face thereof. They are operated by a magnetically controlled plate carrying a cam which projects the pins as they rotate past it. The projected pins in turn control electrical circuits for starting and stopping a motor device that throws the shearing unit out of operation and brings it back again.

A well-known type of cloth shearing machine is shown as mounted on a frame 5 having a power shaft 11 driven from any desired source of power. This shaft, through suitable pulleys with belts, or sprocket wheels and chains, or any other means, drives the shaft of the breast or draft roll 12. It also drives the several shears or revolvers 14, the latter drive not being shown.

The cloth is shown as passing through the machine and as having a transverse seam 9, as previously mentioned. The cloth passes under a guide rod 8 over a cloth conveying or spreading roll 15, over guide rolls 16 and 17 to one of the revolvers 14 and a tiltable rest 18 underneath it. Then the cloth passes, as usual, to the other revolver and the second rest where the top surface of the fabric is sheared, then passes over suitable guides to other revolvers with their other tilting rests, where the under surface of the cloth is sheared. From this the cloth passes over a guide roll 20 and then over the breast or draft roll 12 against which it is pressed by a nip roll 21 operated by gravity. The cloth passes half way around the breast roll and out of the machine, as indicated by the arrow. In the form shown, the shearing unit is thrown out and in by a single phase reversing motor 19 connected to the cloth rests 18 and tilting them back and forth. Both windings 57 of the single phase motor 19 must be energized simultaneously before the motor will start. Different wiring would be used for a motor of a different winding.

The detector means is shown operating against the surface of the cloth-conveying roll 15 so that when the seam passes over the side surface of this roll, that is, practically over the far side of it, the detector will operate and certain actions will be initiated. The conveying roll 15 and detector can be located at any desired elevation at the feed-in end of the machine.

The detecting device embodies a trip rod 24 suspended by a pair of links 25 from a shaft 26 to which the links are pivoted. The shaft 24 is provided with a roll 27 and the links 25 are just long enough so that normally this roll 27 rests against the surface of the cloth-conveying roll or spreader 15 with the axes of the two at the same level. This furnishes a sensitive detector which, at the high speeds now used, will swing outwardly when impinged upon by a seam, giving a very sensitive action.

From the shaft of the breast roll 12 a shaft 30 is driven by a chain or belt 31. On account of this connection, this shaft 30 will always rotate at a speed proportionate to the speed of the cloth through the machine. On this shaft 30 is a pinion 32 which rotates constantly when the machine is running.

The pinion sprocket 32 by chain 33 drives a sprocket 34 and a time switch shaft 35 constantly. Fixed on this shaft is a pin disc 36 provided with a concentric row of perforations in which operating pins 37 are arranged to slide freely in the direction of the axis of the shaft. The shaft 35 is mounted in a stationary bearing 38 on the frame 10. On the frame is mounted a fixed pin restoring cam 39.

On a stud 40 on the frame is pivoted a cam plate 41. This plate carries an adjustable pin operating cam 42 normally pushed away from the pins by a spring 43 and adapted to be moved back into the path of the pins by a solenoid 44 the plunger of which is connected with the rod 45 on which the spring is mounted.

The cam 42 is adjusted as a whole circumferentially to change the time at which the motor 19 will be started and reversed. This is done by moving it around guided by a slot 47 and fixing it in adjusted position by two screws 48. To adjust the length of time during which the motor is started and reversed a longer or shorter length of cam 42 is required. The solenoid is mounted on a bracket 46 carried by the frame 10.

The normal position of the pins 37 in the disc 36 is shown in Fig. 3. Upon the energization of the solenoid 44 its plunger and the rod 45 are pulled inwardly and the cam 42 is brought into the position shown in Fig. 6. As previously stated, the disc 36 is rotating constantly in proportion to the cloth speed. Consequently, this cam will contact the ends of a definite number of pins 37 and move them inwardly, as shown in Fig. 6, as the disc rotates. Now from reference again to Fig. 3 it will be seen that a pair of pivotal holders 50 for mercury switches 51 and 52 are located normally in such position that they do not engage the heads of these pins. When the pins are pushed in, as shown in Fig. 6 their heads come into a position where, when they come around to the proper place in their rotation, they will engage these holders. The holders are so shaped on the bottom that when the heads of the pins engage them they will be swung upwardly about their pivots 53 and the mercury switch will be closed.

In Fig. 7 one of them is shown closed and the other open. As the disc continues its rotation, a stationary cam 39 on the frame 10 will engage the heads of the pins and push them back into the normal position shown in Fig. 3, ready for the next operation. The entire operation to close and open both switches in order is performed during one rotation of the disc.

It will be understood that these pins are freely sliding and do not require any springs or other means for holding them in position. They are pushed back and forth by the two cams and always left in normal position after passing the cam 39 before a rotation of the disc is completed.

The two switches 51 and 52 are respectively for connecting the motor 19 to turn forward and reverse. Referring to the wiring diagram, it will be seen that the detector link 25 normally holds a contact button 54 open. This button has a spring for closing it whenever the detector is moved to the right in Fig. 1 and this completes the circuit from the power mains through the solenoid 44. As stated, this draws the cam 42 into operative position.

The pins being pushed in, as stated, will close the switch 51 and energize a magnet 55 on the multi-contact reversing relay to operate its rod 56 which is a well known construction. Then, the obstruction on the cloth having passed the detector, the contact button 54 will open again and the cam 42 be allowed to be pushed back by the spring 43. It will be seen that this circuit will pass through both windings 57 of the single phase motor 19 in a well known way.

After the pins have passed the holder for the primary mercury switch 51 they will engage the other holder and close the switch 52 while the switch 51 sinks back to the open position. This causes the circuit that has been referred to to be broken and another circuit to be established through the switch 52. Now, the solenoid 55 being deenergized, the secondary reverse switch drops to the position shown and the motor is reversed.

The rotation of the pin disc takes place at a definite ratio to the speed of the draft roll 12, the surface speed of the draft roll being the speed of the cloth travel through the machine. Therefore, each pin represents a definite length of cloth which has to be passed by the shearing unit without contact and the number of pins that are successively pressed inwardly by the control cam 42 to come into contact with the switch holders, represents the length of cloth that will be omitted from shearing contact.

It will be understood, of course, that the turning of the motor 19 in a forward or backward direction has the effect, in the form illustrated, of moving the cloth support 18 into or out of operative relation to the revolver or shear 14 and holding it there while conditions remain the same. Therefore, if it is desired to vary the amount or length of cloth which remains unsheared before and after the change, this is provided for by exchanging the cam 42 one of the lengths required, as has been stated. If it is desired to advance or retard the instant at which the change takes place, the cam 42 is adjusted along its arc forward or back.

The two mercury switches are so wired that each controls the direction of rotation of the motor, one giving a counter clockwise and the other a clockwise direction. When the first one of the pins that have been pressed into operative position by the cam 42 is brought, by the rotation of the disc, into contact with the primary switch holder, the latter will be turned enough to close its switch. This starts the motor in revolution in a direction to interrupt the shearing action or into a non-shearing position.

The pins continue to rotate with the disc and hold the primary switch closed and finally turn the secondary switch holder. By the use of the multi-contact reversing relay, a momentary interlocking is provided and the secondary switch is not allowed to function until the pins in arcing contact with the primary switch are carried far enough along by the rotation of the disc to release the primary switch and allow it to open its circuit. The secondary switch, when turned, closes its circuit and, after the release of the primary switch, reverses the motor and brings the shearing unit into operative condition. The pin disc, upon further rotation, carries the pins still in operating position, into contact with the cam 39 and the pins are pressed back into the disc.

Of course, it will be understood that I have described this invention specifically in connection with a cloth shearing machine. Whether used for that purpose or some other, the revolution of the disc can be obtained by connection with a source of power, either directly or indirectly, of a part of the processing element. When the source of power is other than a reversing motor the operative or non-operative relation of the processing unit can be provided for. In this case the switch or switches are connected to make and break an electric circuit to control the source of power, either to rotate forwardly or stand still and the ratio of rotative movement can be changed by equivalent methods to that shown.

This invention is not confined to the shearing process of the textile industry, or even to the textile industry itself, but the same principle of operative control is capable of application to a wide range of processes in this and other industries.

Having thus described my invention and the advantages thereof, I do not wish to be limited to the details herein disclosed, otherwise than as set forth in the claims, but what I do claim is:

1. In a switch operating means, the combination of a constantly rotating disc, a series of pins movably mounted thereon, means on one side of the disc for moving said pins as the disc rotates, means for operating a switch by the pins that have been moved, and means independent of the disc and located on the other side of the disc for restoring the pins to normal inactive position as the disc continues its rotation.

2. In a device of the character described, the combination of a rotatable disc, a series of pins movably mounted thereon, a movable cam, and means for moving the cam into a position to contact the pins as the disc rotates and move them relatively to the disc.

3. In a device of the character described, the combination of a rotatable disc, a series of pins arranged in a circle on the disc with their axes parallel with and equally distant from the axis of the disc, a pivoted plate adapted to be swung on its pivot means for swinging the plate as the disc turns, and a cam carried by the plate and movable therewith into a position to contact the ends of the pins as the disc rotates and push them transversely of the disc.

4. In a device of the character described, the combination of a rotatable disc, a series of pins arranged in a circle on the disc with their axes parallel with and equally distant from the axis of the disc, a cam pivotally supported on an axis transverse to the axis of the disc and adapted to be swung on its pivot into a position to contact the ends of the pins as the disc rotates and push them transversely of the disc, and a solenoid having means for swinging the cam.

5. In a device of the character described, the combination of a rotatable disc, a series of pins arranged in a circle on the disc with their axes parallel with and equally distant from the axis of the disc, a pivotally supported cam adapted to be swung on its pivot into a position to contact the ends of the pins as the disc rotates and push them transversely of the disc means for swinging said cam, and a fixed cam on the other side of the disc for restoring the pins as the disc rotates further.

CHARLES H. COOLIDGE.